Figure 1:
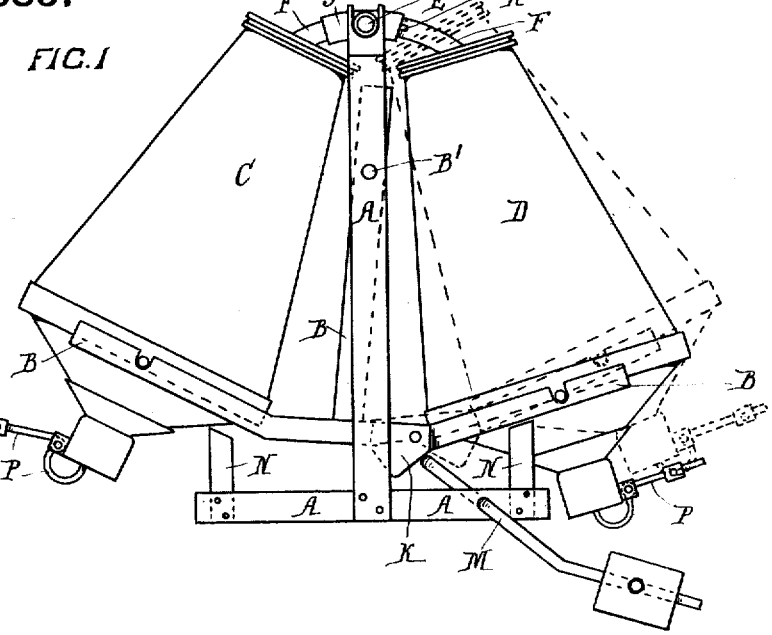

C. E. GANE.
MEANS FOR AUTOMATICALLY DELIVERING THE MILK FROM THE VACUUM PIPES OF MILKING MACHINES.
APPLICATION FILED AUG. 31, 1909.

950,385.

Patented Feb. 22, 1910.

WITNESSES;

INVENTOR,
CYRIL EDMUND GANE,
by
Attorney.

UNITED STATES PATENT OFFICE.

CYRIL EDMUND GANE, OF NORMANBY, NEW ZEALAND.

MEANS FOR AUTOMATICALLY DELIVERING THE MILK FROM THE VACUUM-PIPES OF MILKING-MACHINES.

950,385. Specification of Letters Patent. Patented Feb. 22, 1910.

Application filed August 31, 1909. Serial No. 515,503.

*To all whom it may concern:*

Be it known that I, CYRIL EDMUND GANE, subject of the King of Great Britain, residing at Normanby, in the Dominion of New Zealand, have invented a new and useful Means for Automatically Delivering the Milk from the Vacuum-Pipes of Milking-Machines; and I do hereby declare the following to be a full, clear, and exact description of the same.

This invention has been designed in order to provide means whereby the milk flowing along the main vacuum pipe in a milking machine installation, may be automatically delivered from such pipe into a milk receiver, without having to break the vacuum or to stop the milk flow.

The invention has been designed specially for use in conjunction with those classes of milking machine installations in which the milk from the whole or a series of the teat cup sets, is drawn up into a main vacuum pipe and carried to a receiving tank in which a vacuum is maintained. When this tank becomes filled, it is necessary in order to empty it, to stop the milking operations, and then to break the vacuum and allow the milk to run from the tank. With the present invention, the flow of milk along the pipe will be continuous, the draw of the vacuum will also be continuous and the milk will be automatically released or delivered from the pipe into a receiving tank, which is not connected with the source of vacuum.

The means provided for this purpose consist of a tipping frame upon which a pair of cans are mounted, so that as the frame tips, one can will be raised and the other lowered and vice versa. These cans and frame are arranged below the main milk pipe and so as to rock or tip transversely therewith. The milk pipe is broken away, and its ends are arranged to butt at right angles against pipe connections leading into the tops of the respective cans, and so arranged that the raised can will be in full communication with such pipe so that the vacuum will act through it and draw the milk into it, while the other can is cut off from the pipe and opened to the atmosphere. The raised can drops when it becomes filled with milk, and as it does so, it is automatically cut off from the pipe, while the other can, as it rises, is automatically placed in communication with such pipe, so that the milk will flow into it in turn. Each can is provided with a gravity valve in its bottom, which is adapted to automatically open when the can is lowered and to close when the can is raised. Thus, as the filled cans drop, the valves will open, so that the milk will flow into a suitable receptacle placed beneath to receive it. These operations are then continued, each can as it is filled, dropping and opening its outlet valve, while raising the other can, and closing its outlet valve, in order that it may in turn be filled.

Means are provided for restraining the tipping of the frame and cans until each can is filled to the required amount.

In order that the invention may be properly understood, reference will be made to the accompanying sheet of drawings, in which,—

Figure 2:
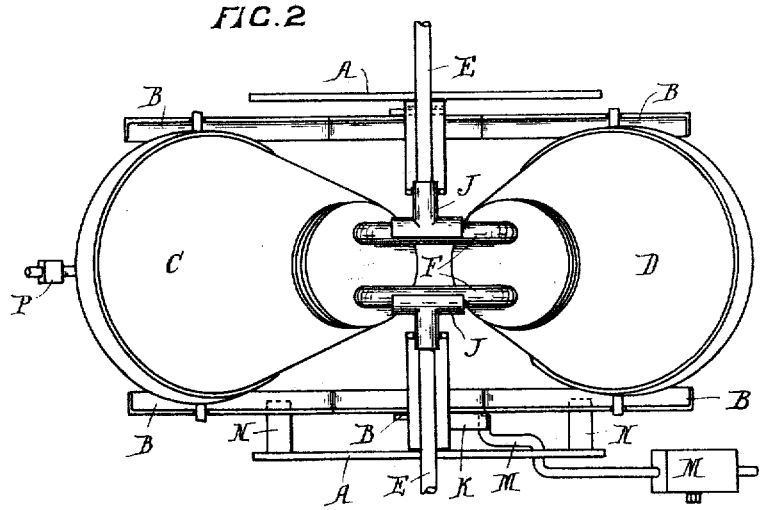
Figure 3:
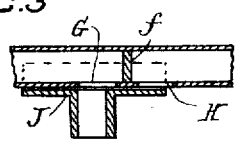
Figure 4:
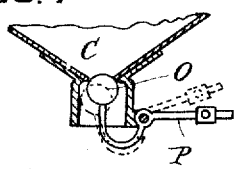

Figure 1 is a side elevation, and Fig. 2 a plan of the means devised. Fig. 3 is a detail sectional view on an enlarged scale, of the joint between the milk pipe and the can connections. Fig. 4 is a sectional elevation of the outlet valve on each can.

A vertical framework A, supports a tipping frame B which is pivotally hung at B' in such framework so as to be adapted to swing to and fro therein. This tipping frame is so shaped as to be capable of supporting the cans C and D placed thereon, one on each side of the pivot, so that they counterbalance one another, and serve to keep the frame normally level.

E is the ordinary vacuum and milk tube leading from the several milking sets to the source of vacuum, and which, in this invention, is divided into two portions so as to allow of the insertion of the invention between the divided ends.

F, F are a pair of parallel pipes that extend across between the tops of the two cans C and D, and enter both of them. The through passage from can to can through these pipes is prevented by the block *f* (Fig. 3) inserted in each pipe at about midway in its length. Each pipe is provided on its outer side with a pair of openings G, H, formed therein one on each side of the block *f* so that the openings G of both tubes communicate with the can C, while the openings H communicate with the other can D. The frame A and cans are so arranged that the tipping frame works at right angles to the pipe E, and so that the respective pipes F lie at right angles across the divided ends of such pipe. Attached to each of such ends is a sleeve J which wholly or partially encircles the corresponding pipe F so that when the tipping frame is rocked on its pivot so as to move the cans up and down, these pipes F will slide to and fro within such sleeves. The openings G, H, in the pipes are so disposed with relation to each other, and the sleeves J, that when the can C is in the raised position shown in Fig. 1, the openings G will be fully enveloped in the sleeves, and will be coincident with the open ends of the pipes E while the openings H in such pipes will be shut off from the open ends of the pipes E and will be partially uncovered from the sleeve (as shown in Fig. 3). Thus, the can C will be placed in uninterrupted communication with the pipe E, so that the vacuum acting through such pipe will draw the milk into the can. At the same time, the can D will be open to the atmosphere through the partially uncovered openings H. When the can C is lowered and the can D raised, the positions will be reversed, and the can D placed into communication with the pipe E, while air is admitted to the can C. These movements of the cans with their tipping frame depend upon the filling of each can in turn, so that the weight of the milk flowing into it, will cause it to drop and cut off communication with the milk supply and at the same time raise the other can into communication therewith. In order that the frame may be prevented from thus tipping until each can in the raised position, is full or approximately full of milk, a block K is secured to one side of the frame and formed with a pair of oppositely inclined cam faces on its underside. A counterweighted crank lever M is pivoted in the framework, and the crank end of such lever underlies the cam faces of the block K and by reason of the counterweight, serves to hold the frame B from tipping. As, however, the weight of milk in the raised can reaches the amount determined on, the inclined cam faces will tend to slide over the lever, and will tip it and thereby allow the frame to swing across to the other side. The crank end of the lever will then engage with the opposite cam face of the block and retain the frame from tipping again until the can then in the raised position, becomes fully weighted with milk. The amount of milk necessary to overcome the action of the lever M may be regulated by adjusting the position of the weight upon such lever. The cam faces being arranged in the manner shown will provide for the frame tipping slowly until the apex of the block has passed over the crank when the rest of the movement will be accelerated. Blocks N are fixed to limit the movements of the tipping frame.

Each of the cans is provided with an outlet opening in its bottom, such opening being governed by the ball valve O which is mounted on a counterweighted arm P so adjusted that it will act as an exact counterpoise for the valve. When, therefore, the can rises and alters its center of gravity by inclining inward to a greater degree, as shown by the dotted lines in Fig. 1, the ball will be caused to rise and block the outlet, being assisted in retaining its seat thereon by the draw of the vacuum in the can to which it will then be subjected. When the can falls again, this movement will be reversed, and the ball will swing down away from the outlet so as to open it. The actions of the valve will be assisted by the accelerated movement of the frame during the latter portion of its movement and to the sudden stoppage thereof by the engagement of the frame with one or other of the blocks N. Consequently, as each can when filled, swings down, its outlet valve will be opened so that the milk will flow from the can into a receptacle placed beneath to receive it, such outflow being assisted and allowed for by the admission of the air to the top of the can in the manner indicated.

The positions of the openings G, H, in the pipes F will be so governed with regard to the open ends of the pipe E that each can, as it rises, will be placed in communication with such pipe before the other is entirely cut off. This will serve to prevent any breakdown of the vacuum suction through the pipe E, and any stoppage of the milking operations.

What I do claim as my invention, and desire to secure by Letters Patent, is,—

1. Means for the purposes herein described, consisting of a pair of cans carried on opposite ends of a rocking frame arranged to rock transversely beneath the main vacuum-milk pipe and means whereby each of such cans may be alternately placed in communication with the pipe and with the atmosphere, while the other can is in communication alternately with the atmosphere, and with the pipe, substantially as specified.

2. Means for the purpose herein described, comprising in combination, a supporting framework, a rocking frame pivoted within such framework, a pair of cans carried one on each end of the rocking frame, a main milk-vacuum pipe extending transversely across between the cans, connections extending between the cans and intercepting such pipe, and so constructed that as the frame rocks to raise each can in turn, such raised can will be placed in communication with the pipe, while the lowered can is cut off from communication therewith, and an outlet valve in the bottom of each can adapted to automatically open and close with the fall and rise of the can, substantially as specified.

3. In means for automatically delivering the milk from the vacuum pipes of milking machines, in combination, a pivoted rocking frame arranged to rock transversely beneath the vacuum milk pipe, a pair of cans supported one upon each end of such frame, connections extending between the cans and intercepting the main vacuum milk pipe, a block having oppositely inclined cam faces on its underside, secured upon the rocking frame and a counterweighted crank lever pivoted beneath such block and arranged with its crank end bearing against the cam faces thereof, substantially as specified.

4. In means for automatically delivering the milk from the vacuum pipes of milking machines, in combination, a pivoted rocking frame arranged to rock transversely beneath the main vacuum milk pipe, a pair of cans supported one upon each end of such frame, a pair of pipes extending across between the tops of the cans, each provided with a block dividing the passage therethrough and with an opening in its wall on each side of such block, sleeves upon the intercepted ends of the main vacuum milk pipe and enveloping the respective pipes extending across between the cans, each of such sleeves being adapted to partially cover one of the openings in the pipe within it, while the other opening is in a position coincident with the passage through the main pipe, substantially as specified.

5. In means for automatically delivering the milk from the vacuum pipes of milking machines, in combination, a pivoted rocking frame arranged to rock transversely beneath the main vacuum milk pipe, a pair of cans supported one upon each end of such frame, connections extending between the cans and intercepting the main vacuum milk pipe, an outlet in the bottom of each can, a valve adapted to close such outlet and a counterweighted lever to one arm of which such valve is attached, substantially as specified.

In testimony whereof, I have signed this specification in the presence of two subscribing witnesses.

CYRIL EDMUND GANE.

Witnesses:
W. ALEXANDER,
W. E. BROWN.